April 26, 1966  G. E. VAUTIN  3,247,909
APPARATUS FOR HARVESTING STRAWBERRY PLANTS
Original Filed Oct. 22, 1962  4 Sheets-Sheet 2

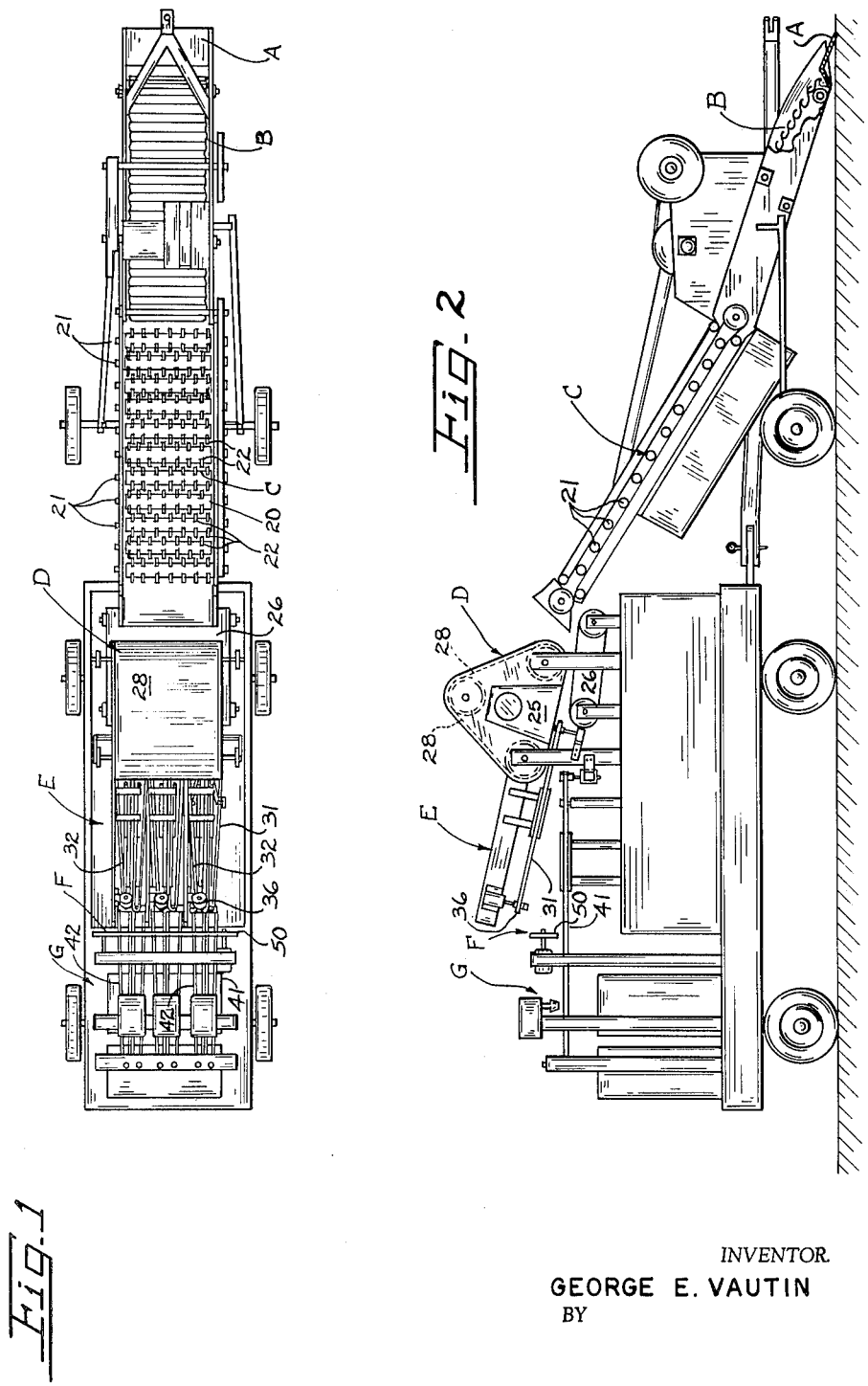

INVENTOR.
GEORGE E. VAUTIN
BY

ATTORNEY

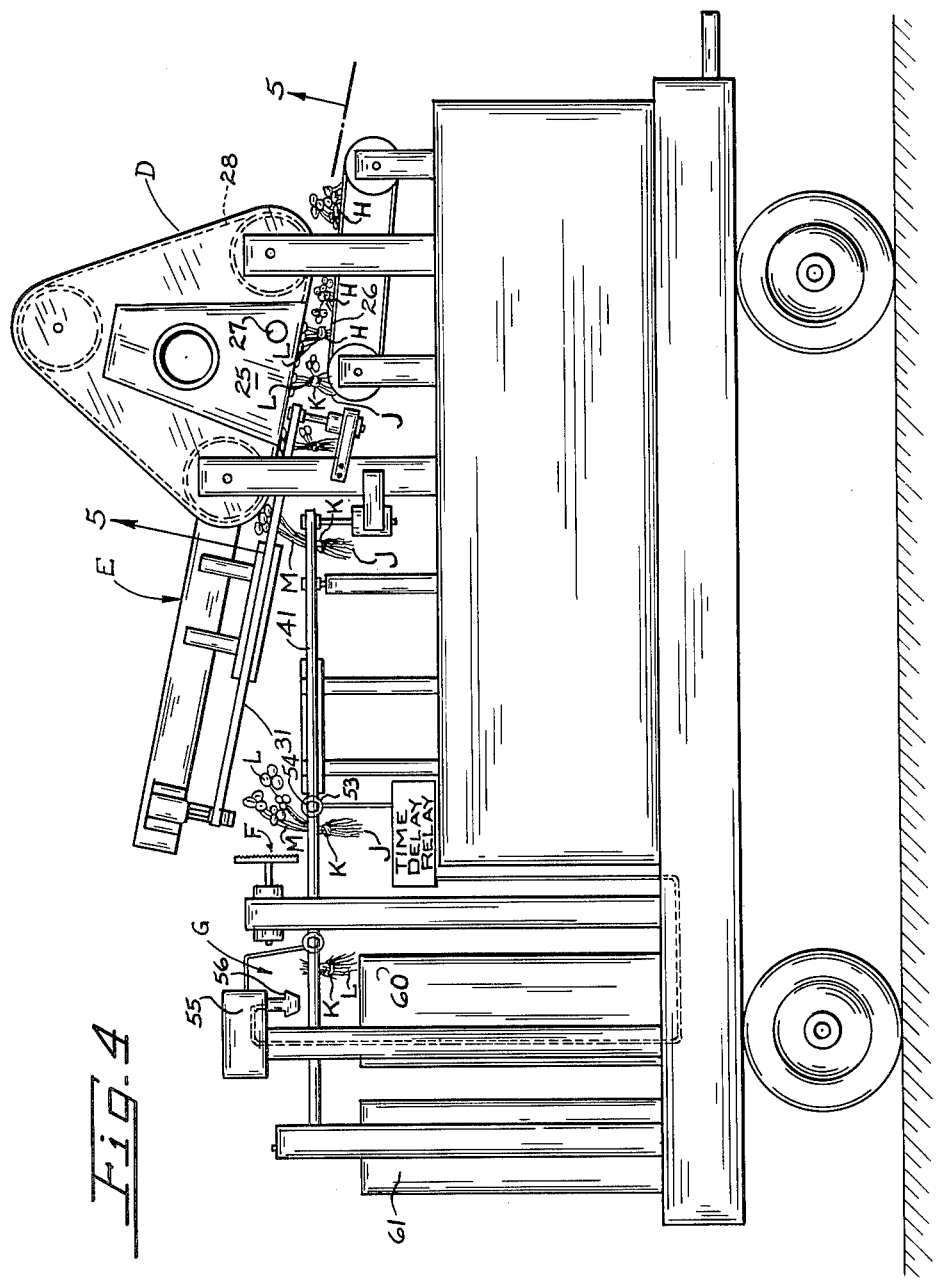

April 26, 1966 G. E. VAUTIN 3,247,909
APPARATUS FOR HARVESTING STRAWBERRY PLANTS
Original Filed Oct. 22, 1962 4 Sheets-Sheet 4
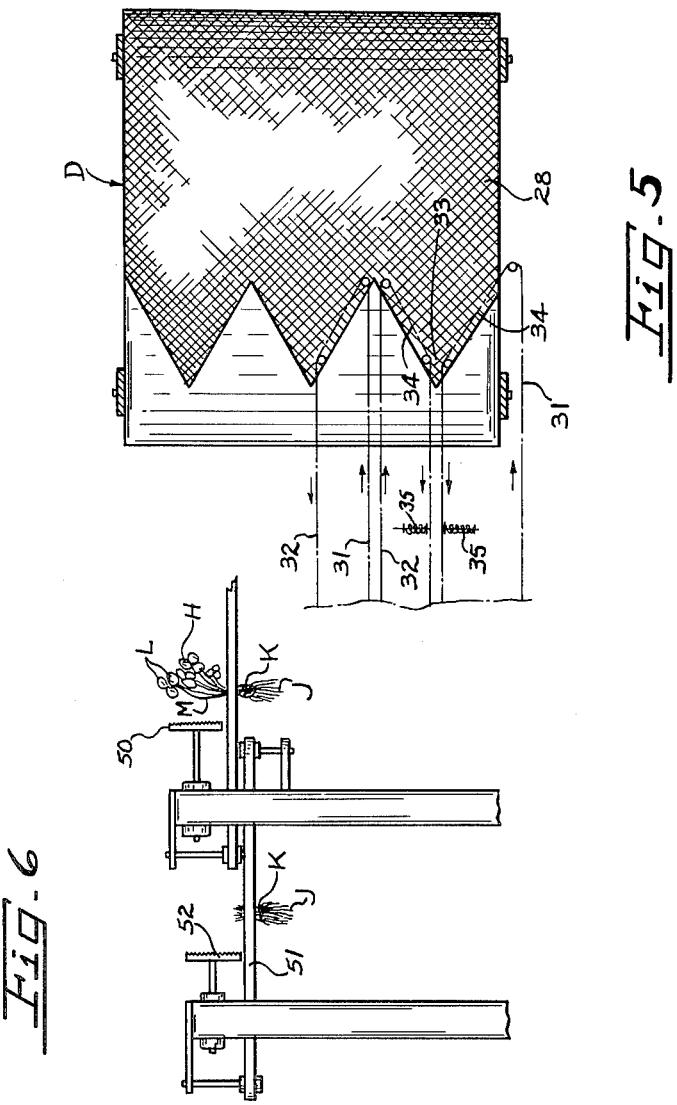
INVENTOR.
GEORGE E. VAUTIN
BY
ATTORNEY

United States Patent Office 3,247,909
Patented Apr. 26, 1966

3,247,909
APPARATUS FOR HARVESTING STRAWBERRY PLANTS
George E. Vautin, Modesto, Calif., assignor to Vautin-Hyde Co., Watsonville, Calif., a corporation of California
Original application Oct. 22, 1962, Ser. No. 231,939, now Patent No. 3,194,317, dated July 13, 1965. Divided and this application Jan. 14, 1965, Ser. No. 432,928
5 Claims. (Cl. 171—17)

This application is a division of application Serial No. 231,939, filed October 22, 1962, now Patent No. 3,194,317.

This invention relates to an apparatus for harvesting strawberry plants.

Strawberry plants are grown as clones. The farmer growing them for their berries plants the clones in the well-known manner and picks the berries from time to time. The present invention relates, however, to the harvesting of the strawberry plants by the nursery which sells the plants to the farmers.

Heretofore the harvesting of strawberry plants has been a time-consuming operation with a great deal of hand labor. The plants themselves are reproduced vegetatively by runners, so that what are called mother plants send out runners that root and form what are known as daughter plants. The harvesting of the plants requires the severing of the daughter plants from the mother plants, the mother plants being discarded, and the suitably-sized daughter plants sold. It involves digging of the plants out of the ground, freeing the roots from the soil (so that the nursery does not have the expense of shipping large amounts of soil), trimming off the leaves above the crown, and culling out the mother plants and the daughter plants that are too small to be sold.

Apparatus already known can be used to dig the strawberry plants and sever the mother plants from the daughter plants. However, no known apparatus can mechanically handle the plants from that stage: orienting the daughter plants and cutting off their leaves above the crown. Heretofore this has been done only by hand with a worker bunching together a few daughter plants and then cutting them off, and it has taken a great deal of time. The present invention solves the problem of orienting the strawberry plant properly, of assuring a cut, and of doing this mechanically with a very minimum of hand labor.

Thus, an important object of the invention is to enable the mechanical harvesting of strawberry plants, including all the steps of digging, shaking off of the dirt, severing of the daughter plants from the mother plant, trimming off of the leaves, separating the plants according to size of crown, and finally packing and bunching.

Other objects and advantages of the invention will appear from the following description of a preferred form of apparatus.

In the drawings:

FIG. 1 is a top plan view of a strawberry plant harvester embodying the principles of the invention.

FIG. 2 is a view in side elevation of the same, with a portion broken away and shown in section.

FIG. 4 is a view in side elevation of the rear portion of the machine.

FIG. 5 is a view in section taken along the line 5—5 with some of the guide belts that lie therebelow shown in phantom.

FIG. 6 is a fragmentary view in side elevation of a modified form of end portion of the invention.

Figure 3:
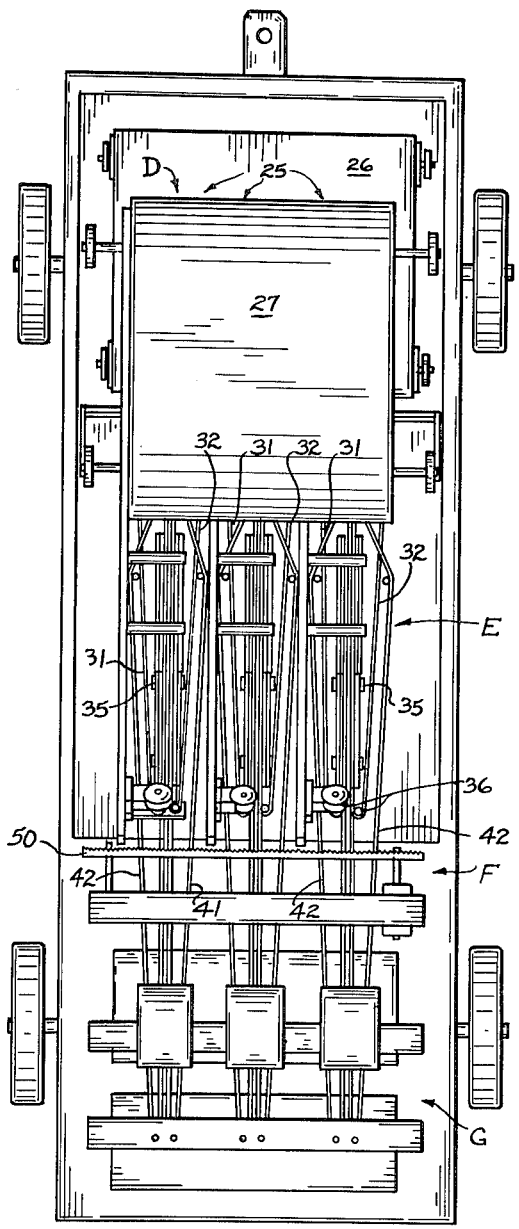
FIG. 3 is an enlarged plan view of the rear portion of the machine.

The strawberry harvester shown in the accompanying drawings incorporates a digger A, a lifting conveyor B, a runner cutting device C, an orienting device D, an aligning device E, and a trimming device F. It also preferably incorporates a separating apparatus G.

The digging apparatus A is substantially the same as a conventional potato digger and a suitable potato digger with such modifications as may be desirable may be used. The lifter B is also similar to that in a potato digger and serves the function principally of lifting the strawberry plants above the ground after they have been dug, some of the dirt dropping off during this movement. The plants are then conveyed to the cutter C. This device consists of a series of drums 20 mounted on shafts 21 with a series of blunt blades 22 extending out radially from the drum 20 in a radial plane beyond the drum and spaced axially along the drum 20 and spaced radially or circumferentially from each other. Successive drums 20 are so made that the blades 22 do not touch each other but lie fairly closely adjacent so that the vines can be somewhat torn apart. The drums 20 all rotate in the same direction, i.e., uphill to elevate the plants, but the successive interlocking and action of the blades 22 serves to cut the vines apart quite efficiently as they move up the device C. Thus, the mother plants are separated from the daughter plants during this stage of the operation, and the dirt is also shaken off, so that when they arrive at the top of the apparatus, the cutting and shaking has separated the strawberry plants into individual plants and has shaken the dirt off from their roots. However, at this stage the roots and tops are rather indiscriminately mixed together and it is difficult to say which ones will be at the top and which at the bottom.

Therefore, the orientation apparatus D is used to assure orientation of each strawberry plant so that the leaves are at the top and the roots are at the bottom as they are delivered to the aligning apparatus. The orienting apparatus preferably comprises a set of suction devices 25 having an accompanying conveyor 26. Each suction device 25 is provided with a suitable current of air and exhausts to a desired degree of vacuum. Preferably it includes a spring-loaded valve 27 which, when a desired amount of vacuum is reached, opens to admit air so as to prevent the vacuum from exceeding the predetermined amount. This means that the variation natural due to the bunching of plants will not affect the efficiency of the apparatus. I have found that a suction apparatus of this type invariably will orient the plants by attracting and holding the leaves while having no effect whatever upon the roots. The plants are sucked by the leaves and therefore the leaves are at the top and the roots are at the bottom. Even if one were to hold the plant upside down, the suction apparatus 25 would not hold on to the roots, so that all that needs to be done is to assure that the plants will be brought to the suction device 25 in such a way that the leaves will be within the suction stream, and they will be sucked up against a conveying device 28.

The conveying device 28 may comprise a moving screen or perforated belt, moving the strawberry plants H in the desired direction between the cutting device C and the aligning device E.

As the plants H move along the device D, they are moving in an upright position, the roots J hanging down, the leaves L at the top, and the crown K between the leaves L and the roots J. The next step in the device is to align the plants H so that the crowns K will aways be at a set height, in order that the cutting may be done at the desired height above the crown K. Some plants H will have very long stems M going to the leaves L and some plants H will have very short stems M. This has little or nothing to do with the root development or with the state of the plant, but simply is individual variation due to many factors.

In order to produce the desired alignment with the crown at the proper position, I provide the device E which includes two pairs of moving belts. Each pair of moving belts is composed of two parallel belts moving in the same direction and located side by side very close to each other, so as to clamp the plant H by its stems M and carry it through. Thus, upper belts 31, 32 have an entrance 33 under the suction device 25 and relatively close to them so that they grasp the plant by the upper end of the stems M closely adjacent to the leaves L. Thus, the plant H is moved into the belts 31, 32 by the suction apparatus, being guided there by suitable guide portions 34 of the belts' runs, and upon arrival at the belts 31, 32, the stem M moves in between the belts 31, 32 and is clamped between them. The belts 31, 32 are held adjacent each other by yieldable means 35 such as springs, which enable the belts 31, 32 to move apart enough so that they do not crush the stems M but still give enough force to hold them.

The lower belts 41, 42 have an entrance spaced along a slight distance from the upper belts 31, 32 and are spaced initially a relatively short distance below them. The second pair of belts 41, 42 then grasp the stems M of the strawberry plants H a short distance below that at which the upper belts 31, 32 have grasped them. From this point, the belts 31, 32 and 41, 42 diverge, the lower belts 41, 42 preferably keeping a substantially level course, while the upper belts 31, 32 preferably move upwardly, pulling the stems M up until the bulge at the crown K comes up against the lower side of the lower belts 41, 42 and prevents further pulling. During the initial part of this divergent movement, the upper belts 31, 32 are made with their spring-yielding members 35 to be in greater tension than those of the lower belts, and during the latter part of the lower belts 41, 42 are made to be urged under greater tension than the upper belts 31, 32 so that the tension on the upper belts 31, 32 gradually relaxes while the tension on the lower belts gradually increases, both increases and decreases being stepwise by virtue of the separate yieldable spring members 35 along the way. Then the run of the upper belts 31, 32 stops at such a point 36 as will assure the plants H all being carried by the lower belts 41, 42 all at a height where the crown K is substantially snug against the lower belts 41, 42. If this happens before the end 36 of the upper belts 31, 32 is reached, the release of tension enables the stems and leaves to be pulled through the upper belts 31, 32.

Preferably, the lower belts 41, 42 move faster than the upper belts 31, 32 to make sure that all plants are pulled up to the crown K even if the belt divergence is less than the greatest stem length.

The lower belts 41, 42 then move on toward the trimming device F. Preferably, this comprises a band saw 50, and if there are three pairs of lower belts 41, 42, a single band saw 50 will still suffice to cut the plants carried by all of them. The band saw 50 is located fairly closely adjacent the upper edge of the lower belts 41, 42 and the cut is then made a short distance above the crown, a distance approximately equal to the height of the lower belts 41, 42. This completes the step of trimming off the plants.

After trimming, in one form of the invention (FIG. 6), a new pair of belts 51 engage the crown for better sizing. These belts 51 move at different speeds from each other and rotate the crown K. Additional trimming saws 52 may be provided after the rotation, if desired.

It will be appreciated that the plants with a larger crown will cause more retraction by springs 43 that urge the lower belts 41, 42 together, and this fact can be used to separate the plants from each other. At a suitable station along the lower belts 41, 42 at a time when the crowns K are snug against them, the belts may move the plants H between a couple of spring loaded members 53, 54 which yield in varying amounts according to the thickness of the crown. Thus, the mother plants will move the springs a relatively large distance while the daughter plants will move them a much smaller distance, and the very small plants will move them very little. This can be used to grade the plants into two or three streams. Thus, the springs when urged out by mother plants, causing a wide diversion, can be used to actuate a switch 57 that energizes a time-delay relay 58 for actuating a release mechanism beyond the trimmer 50 which causes the mother plants to drop out at that station, the belts being opened by a solenoid 55 sending a wedge 56 in between the belts 41, 42 or by some other suitable means. The mother plants are then dropped out, as into a bin 60, to be disposed of as desired. The medium sized plants, which are the desired ones, can also be made to drop out at a different station, as into a bin 61, by the same general means. Finally, the small plants can be carried to the end of the belts 41, 42 and be disposed of there. Or, if desired, all but the mother plants can be carried to the end of the line, for the separation is a relatively easy one there.

An important feature of this invention is the fact that the strawberry plants are handled very quickly and are kept fresh. The time elapsed between the digging and the packing into boxes is but a few moments, in the nature of a minute, or at the most, say five minutes, whereas in present practice it is quite common for several hours to elapse, so that the plants are not fresh when packed. This means that plants harvested by this invention can be packed into boxes much quicker and can be refrigerated, treated, or shipped much quicker and therefore can be kept in a fresh state much more suitable to standing the shock of transplanting than is the case in the conventional practice. They may be packed directly into boxes from the belt, either by hand or by a suitable mechanical packing apparatus.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A strawberry-plant trimmer, comprising:
a main frame,
means on said frame for elevating dug individual strawberry plants, severed from other plants, to an upper station,
moving and suction means on said frame at said upper station for sucking up the leaves of the plants and orienting them in a vertical position,
a first pair of belts on said frame between which said suction means deposit said plants and which move them in a line,
a second pair of belts on said frame below said first pair subsequently engaging said plants, said first pair of belts diverging from said second pair, whereby said first pair draws said plants up until the crown engages said second pair, and
saw means for trimming said plants just above said crown.

2. A strawberry-plant harvester, comprising:
a main frame,
means on the forward end of said frame for digging strawberry plants out from the soil,
elevating means on said frame to the rear of said means for digging, for conveying the dug plants upwardly,
runner-severing means on said frame associated with said elevating means for cutting the runners connecting mother plants to daughter plants, moving and suction means on said frame to the rear of and above the upper end of said elevating means, for sucking up the leaves of the plants and orienting them in a vertical position, a first pair of belts on said frame between which said suction means deposit said plants and which move them, a second pair of belts on said frame below said first pair subsequently engaging said plants, said first pair of belts diverging from said second pair, whereby said first pair draws said plants up until the crown engages said second pair, and saw means for trimming said plants just above said crown.

3. The harvester of claim 2 wherein said second pair of belts moves faster than said first pair of belts.

4. The harvester of claim 2 wherein a third pair of belts grasps said crowns after they pass said saw means, said second pair of belts then releasing them, one belt of said third pair moving faster than the other, to rotate said plants, and second saw means to cut off the plants in different rotary position from that where said first-named saw means cut them.

5. The harvester of claim 2 having means for releasing said belts so as to drop said plants and means for causing release of the larger-crown plants at a different place from the release of the smaller-crown plants.

References Cited by the Examiner

UNITED STATES PATENTS

| | | | |
|---|---|---|---|
| 2,197,225 | 4/1940 | Pierson | 171—42 X |
| 2,553,519 | 5/1951 | Lenz | 171—17 |
| 2,625,781 | 1/1953 | Tateyama | 171—34 |
| 2,833,357 | 5/1958 | Lust | 171—37 |
| 2,943,430 | 7/1960 | Carruthers | 56—19 X |
| 3,084,496 | 4/1963 | Leonard et al. | |
| 3,163,234 | 12/1964 | Boyer | 171—17 |

ABRAHAM G. STONE, *Primary Examiner.*

ANTONIO F. GUIDA, *Examiner.*